(12) United States Patent
Fujimine et al.

(10) Patent No.: US 6,497,962 B1
(45) Date of Patent: Dec. 24, 2002

(54) LOW MELTING POINT GLASS FOR COVERING ELECTRODES, AND PLASMA DISPLAY DEVICE

(75) Inventors: Satoshi Fujimine, Kanagawa (JP); Yumiko Aoki, Kanagawa (JP); Tsuneo Manabe, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 14 days.

(21) Appl. No.: 09/702,742

(22) Filed: Nov. 1, 2000

(30) Foreign Application Priority Data

Nov. 19, 1999 (JP) .............................. 11-330122

(51) Int. Cl.[7] .................... C03C 3/064; C03C 3/072; B32B 17/06
(52) U.S. Cl. .................... 428/426; 428/469; 428/432; 428/702; 501/50; 501/51; 501/52; 501/74; 501/75; 501/77; 349/138
(58) Field of Search ................ 428/426, 469, 428/432, 433, 697, 699, 702; 501/74, 75, 76, 77, 78, 79, 53, 41, 49, 50, 51, 52, 121, 122

(56) References Cited

U.S. PATENT DOCUMENTS

| | | | | |
|---|---|---|---|---|
| 4,256,495 A | * | 3/1981 | Kawamura et al. |
| 4,278,326 A | * | 7/1981 | Kawamura et al. |
| 5,273,948 A | * | 12/1993 | Yamazaki et al. |
| 5,346,863 A | * | 9/1994 | Hikata et al. |
| 5,643,840 A | * | 7/1997 | Hikata et al. |
| 5,948,537 A | | 9/1999 | Onoda et al. |

FOREIGN PATENT DOCUMENTS

| | | | |
|---|---|---|---|
| JP | 09235126 | * | 9/1997 |
| JP | 10-338546 | | 12/1998 |

* cited by examiner

*Primary Examiner*—Deborah Jones
*Assistant Examiner*—Jennifer McNeil
(74) *Attorney, Agent, or Firm*—Oblon, Spivak, McClelland, Maier & Neustadt, P.C.

(57) ABSTRACT

A low melting point glass for covering electrodes, which contains Cu in a content as calculated as CuO within a range of from 0.1 to 0.9% by mass percentage and which contains neither Mo or Sb.

25 Claims, 1 Drawing Sheet

LOW MELTING POINT GLASS FOR COVERING ELECTRODES, AND PLASMA DISPLAY DEVICE

BACKGROUND OF THE INVENTION

1. Field of the Invention

The present invention relates to a low melting point glass suitable for covering for insulation of transparent electrodes of e.g. ITO (indium oxide doped with tin) or tin oxide, and a plasma display device.

2. Discussion of Background

In recent years, a thin flat plate type color display device has attracted an attention. In such a display device, it is necessary to form an electrode for each pixel in order to control the display state in the pixel for forming an image. In order to prevent deterioration of the image quality, transparent electrodes are used as such electrodes. As the transparent electrodes, thin films of ITO or tin oxide formed on a glass substrate, are commonly employed. Here, the tin oxide includes tin oxide doped with e.g. fluorine or antimony.

Transparent electrodes which are formed on the surface of a glass substrate to be used as a display panel of the above display device, are formed into fine lines to realize fine images. In order to control the respective pixels independently, it is necessary to secure insulation among such finely formed transparent electrodes. However, if moisture is present on the surface of the glass substrate, or if an alkali component is present in the glass substrate, it may happen that an electrical current flows to some extent via the surface of this glass substrate. To prevent such a current, it is effective to form an insulating layer between the transparent electrodes. Further, in order to prevent deterioration of the image quality by the insulating layer formed between the transparent electrodes, such an insulating layer is preferably transparent.

Various materials are known as an insulating material for forming such an insulating layer. Among them, a glass material is widely employed which is a transparent and highly reliable insulating material.

In a plasma display device (hereinafter referred to as PDP) which is recently expected as a large size flat color display device, cells are defined and formed by a front substrate used as a display surface, a rear substrate and barrier ribs, and an image will be formed by generating plasma discharge in the cells. Transparent electrodes are formed on the surface of the front substrate, and it is essential to cover the transparent electrodes with a glass excellent in plasma durability in order to protect the transparent electrodes from plasma.

Such a glass to be used for covering electrodes, is employed usually in the form of a glass powder. Namely, to such a glass powder, a filler, etc. may be added as the case requires, and then the mixture is formed into a paste. A glass paste thus obtained is coated on a glass substrate having transparent electrodes preliminarily formed, followed by firing to cover the transparent electrodes.

Such a glass for covering electrodes, is required to have an electrical insulating property, and it is further required that the softening point is, for example, at most 650° C., the linear expansion coefficient is, for example, about $80 \times 10^{-7}/°$C., and transparency of the glass layer covering the electrodes, obtainable by firing, is high. Various glasses have been proposed. For example, JP-A-11-180726 discloses a non-crystalline glass consisting essentially of from 52 to 86% of $PbO+Bi_2O_3$, from 14 to 28% of $B_2O_3$, from 0 to 5% of $SiO_2$, from 6 to 23% of ZnO, from 0 to 8% of $Al_2O_3$, from 0 to 5% of $CeO_2$ and from 0 to 5% of $SnO_2$, as represented by mass percentage.

However, for PDP, a further improvement of image quality has been desired in recent years. Accordingly, it is required to further improve the transparency of the glass layer covering electrodes.

SUMMARY OF THE INVENTION

It is an object of the present invention to provide a low melting point glass for covering electrodes and a plasma display device, which will solve such problems.

The present invention provides a low melting point glass for covering electrodes, which contains Cu in a content as calculated as CuO within a range of from 0.1 to 0.9% by mass percentage and which contains neither Mo nor Sb.

The present invention also provides a low melting point glass for covering electrodes, which contains Cu in a content as calculated as CuO within a range of from 0.1 to 0.9% by mass percentage and which contains at least one of Mo and Sb, wherein the total of the content of Cu as calculated as CuO, the content of Mo as calculated as $MoO_3$ and the content of Sb as calculated as $Sb_2O_3$ is within a range of from 0.2 to 1.4% by mass percentage.

Further, the present invention provides a plasma display device having a front substrate, wherein transparent electrodes formed on a glass substrate constituting the front substrate are covered by such a low melting point glass for covering electrodes.

The present inventors have considered that one of the causes for the decrease in the transparency of the glass layer covering electrodes in PDP is attributable to retention of the after mentioned carbon-containing impurities in the glass layer covering electrodes, and have arrived at the present invention based on this assumption.

The low melting point glass for covering electrodes is used usually in the form of a powder. The powder of the low melting point glass for covering electrodes is formed into a glass paste by using an organic vehicle or the like to impart printability, and such a glass paste is coated on electrodes formed on a glass substrate, followed by firing to cover the electrodes.

The glass layer covering electrodes, obtained by firing, is colored brown or black in many cases even if a coloring component such as a transition metal, is not contained. This phenomenon is considered to be such that carbon-containing impurities contained in the organic vehicle or the like remain in the glass layer covering electrodes, and the glass layer covering electrodes is colored by such carbon-containing impurities. By the above coloring with the brown color, the transmittance of light having a wavelength of 400 nm typically decreases. Further, it is considered that when plasma is generated in PDP, such carbon-containing impurities react with water or the like present in the glass layer covering electrodes and will be discharged from the glass layer covering electrodes, whereby brightness of PDP will also decrease.

DETAILED DESCRIPTION OF THE PREFERRED EMBODIMENTS

Figure 1:
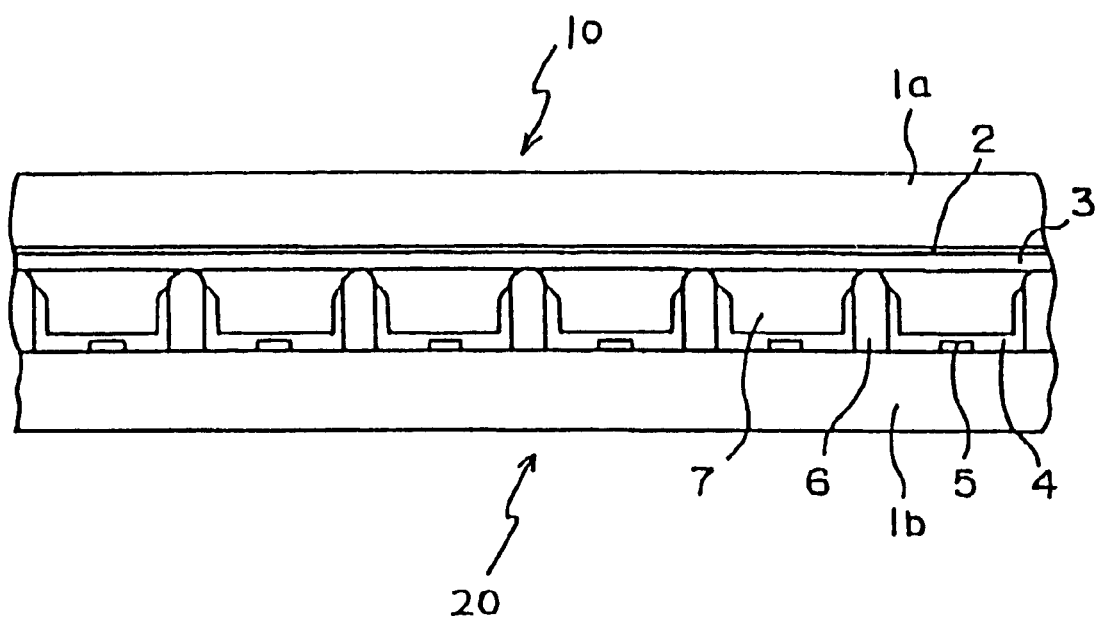
FIG. 1 is a cross-sectional view illustrating a plasma display device of the present invention.

The low melting point glass for covering electrodes of the present invention (hereinafter referred to simply as the glass of the present invention) is used usually in the form of a powder. The powder of the glass of the present invention is formed into a glass paste by using an organic vehicle or the like to impart printability, and such a paste is coated on electrodes formed on a glass substrate, followed by firing to cover the electrodes. Here, the organic vehicle is one having a binder such as ethyl cellulose dissolved in an organic solvent such as α-terpineol. The glass of the present invention is typically lead glass or lead borate glass.

In PDP, the glass of the present invention is preferably used for covering transparent electrodes formed on a front substrate.

The average particle size of the above powder is preferably at least 0.5 μm. If it is less than 0.5 μm, bubbles in the glass layer covering electrodes, obtained by firing, tend to be many, whereby the transparency tends to decrease, or the time required for powdering tends to remarkably increase. More preferably, it is at least 0.7 μm.

Further, the maximum particle size of the above powder is preferably at most 35 μm. The thickness of the glass layer covering electrodes in PDP is usually at most 40 μm, but if the maximum particle size exceeds 35 μm, irregularities are likely to form on the surface of the glass layer covering electrodes, whereby an image of PDP is likely to deform. The maximum particle size is more preferably at most 20 μm.

The softening point of the glass of the present invention is preferably from 450 to 650° C. for the following reasons.

As the above-mentioned glass substrate, one having a glass transition point of from 550 to 620° C. is usually employed. In such a case, in order to avoid deformation of the glass substrate, firing of the above-mentioned glass paste is carried out at a temperature of not higher than 620° C. In order to carry out the firing at a temperature of not higher than 620° C., the softening point of the glass of the present invention is preferably at most 650° C. Further, in order for the glass of the present invention to soften and flow to completely cover electrodes at an early stage of the firing thereby to prevent deterioration of the electrical properties of the electrodes during the firing, the softening point is preferably at most 650° C. More preferably, it is at most 640° C., particularly preferably at most 630° C.

On the other hand, in the front substrate of PDP, if the electrical resistance is too high solely with transparent electrodes made of e.g. ITO or tin oxide, a metal layer of Ag or Al, or of a three layer structure of Cr—Cu—Cr (hereinafter, such a metal layer will be referred to as a metal electrode) may sometimes be formed on such transparent electrodes. If such metal electrodes are covered by a glass having a softening point of less than 450° C., the metal electrodes are likely to be corroded, or corrosion of transparent electrodes is likely to be accelerated via the metal electrodes. When the firing is carried out at a temperature of 520° C. or higher, corrosion of electrodes will be remarkable if the metal electrodes are covered by a glass having a softening point of less than 450° C. Further, in this case, if metal electrodes are covered by a glass having a softening point of from 450 to less than 520° C., corrosion of electrodes can be avoided, but bubbles in the glass layer tend to be large during the firing, whereby the transmittance of the glass layer will decrease.

The softening point of the glass of the present invention is more preferably at least 500° C. It is further preferably at least 520° C., particularly preferably at least 550° C., most preferably at least 580° C. Further, when the softening point is at least 450° C., the organic vehicle in the glass paste will completely evaporate before the softening and flowing start to take place, whereby it will be less likely that the carbon-containing impurities in the organic vehicle will remain in a substantial amount in the glass covering layer to deteriorate the transmittance. Actually, when the relation between the temperature and the weight reduction was examined by heating a mixed powder obtained by mixing, in a mortar, ethyl cellulose used as a binder as a constituting component of the organic vehicle and a glass powder having a softening point of 600° C. and an average particle size of 3 μm, at a temperature rising rate of 10° C./min, the weight reduction became 0 at 450° C.

Further, when the softening point is at least 520° C., the glass layer covering electrodes can be made to have a single layer structure. If the softening point is less than 520° C., it is difficult to make the glass layer to have a single layer structure because of the above-mentioned corrosion phenomenon of transparent electrodes, and it will be required to have a non-single layer structure comprising an upper layer made of a glass having a softening point of less than 520° C. and a lower layer made of a glass having a softening point higher than 520° C. Here, the lower layer is a layer which is in direct contact with the transparent electrodes.

As the above-mentioned glass substrate, one having an average linear expansion coefficient within a range of from 50 to 350° C. of from $80\times10^{-7}$ to $90\times10^{-7}$/° C. is usually employed. Accordingly, in order to let the expansion characteristic match with such a glass substrate to prevent warping or deterioration in strength of the glass substrate, the average linear expansion coefficient of the glass of the present invention is preferably from $60\times10^{-7}$ to $90\times10^{-7}$/° C., more preferably from $70\times10^{-7}$ to $85\times10^{-7}$/° C. The average linear expansion coefficient within a range of from 50 to 350° C. will be hereinafter referred to simply as an expansion coefficient.

Further, the resistivity within a range of from room temperature to 400° C. of the glass of the present invention, more typically, the resistivity within a range of from room temperature to 300° C., is preferably 0.1 time or more of the resistivity within the above temperature range of the glass used for the above-mentioned glass substrate. If this condition is not satisfied, the electrical insulating property is likely to be inadequate.

The resistivity at 150° C. of the glass to be used for the glass substrate is typically about $10^{11}$ Ω·cm. Accordingly, the resistivity at 150° C. of the glass of the present invention is preferably at least $10^{10}$ Ω·cm, more preferably at least $10^{11}$ Ω·cm.

The relative dielectric constant of the glass of the present invention is preferably at most 18. If it exceeds 18, the capacitance of cells of PDP tends to be too large, and the electric power consumption of PDP tends to increase. The relative dielectric constant is more preferably at most 12, particularly preferably at most 10.5, most preferably at most 10.

Preferably, the glass of the present invention does not crystallize during the firing. From this viewpoint, it is preferred that the crystallization temperature $T_c$ of the glass of the present invention is higher than the firing temperature, more preferably higher by 80° C. than the firing temperature. Here, the crystallization temperature is a crystallization peak temperature obtainable by a differential thermal analysis (DTA), and in a case where no crystallization peak is observed, $T_c=\infty$. Such $T_c$ is preferably at least 700° C. If it is lower than 700° C., the glass is likely to crystallize during firing at a temperature of from 500 to 620° C., which is commonly carried out, whereby the transparency is likely to decrease. More preferably, it is at least 750° C.

In the first embodiment of the glass of the present invention, the glass contains neither Mo nor Sb, but contains Cu as an essential component. If the Cu content as calculated as CuO (hereinafter referred to as the CuO content) as represented by mass percentage, is less than 0.1%, the transmittance of the glass layer covering electrodes tends to be low. It is preferably at least 0.2%, more preferably at least 0.3%. If it exceeds 0.9%, coloring attributable to Cu tends to be too deep. It is preferably at most 0.8%, more preferably at most 0.7%. Hereinafter, the content will be represented by mass percentage.

Now, the second embodiment of the glass of the present invention will be described.

In the second embodiment of the glass of the present invention, the glass contains Cu as an essential component and in addition, contains at least one of Mo and Sb.

In this embodiment, the CuO content is from 0.1 to 0.9%. If it is less than 0.1%, the transmittance of the glass layer covering electrodes tends to be low. It is preferably at least 0.2%, more preferably at least 0.3%. If it exceeds 0.9%, coloring attributable to Cu tends to be too deep. It is preferably at most 0.8%, more preferably at most 0.7%.

Further, the total of the Mo content as calculated as $MoO_3$ (hereinafter referred to as the $MoO_3$ content), the Sb content as calculated as $Sb_2O_3$ (hereinafter referred to as the $Sb_2O_3$ content) and the CuO content, is from 0.2 to 1.4%. If the total is less than 0.2%, the transmittance of the glass layer covering electrodes, tends to decrease. It is preferably at least 0.3%. If it exceeds 1.4%, coloring due to Cu, Mo or Sb tends to be too deep. It is preferably at most 1%, more preferably at most 0.9%.

The $MoO_3$ content is preferably at most 1.2%. If it exceeds 1.2%, coloring due to Mo in the glass layer covering electrodes, tends to be too deep. It is preferably at most 1%, particularly preferably at most 0.9%. When Mo is contained, the $MoO_3$ content is preferably at least 0.1%, more preferably at least 0.2%, particularly preferably at least 0.3%.

The $Sb_2O_3$ content is preferably at most 1.2%. If it exceeds 1.2%, coloring due to Sb in the glass layer covering electrodes, tends to be too deep. It is more preferably at most 1%, particularly preferably at most 0.9%. When Sb is contained, the $Sb_2O_3$ content is preferably at least 0.1%, more preferably at least 0.2%, particularly preferably at least 0.3%. The glass of the present invention preferably consists, as represented by mass percentage based on the following oxides, essentially of:

| | Mass percentage |
|---|---|
| PbO | 25 to 85% |
| $B_2O_3$ | 0 to 60%, |
| $SiO_2$ | 0 to 40%, |
| $Al_2O_3$ | 0 to 25%, |
| $Bi_2O_3$ | 0 to 35%, |
| MgO | 0 to 40%, |
| CaO | 0 to 40%, |
| SrO | 0 to 40%, |
| BaO | 0 to 40%, |
| ZnO | 0 to 55%, |
| $Li_2O$ | 0 to 20%, |
| $Na_2O$ | 0 to 20%, |
| $K_2O$ | 0 to 20%, |
| CuO | 0.1 to 0.9%, |
| $MoO_3$ | 0 to 1.3%, |
| $Sb_2O_3$ | 0 to 1.3%, | and MgO+CaO+SrO+BaO is from 0 to 40%. Here, the glass wherein $MoO_3$ is 0% and $Sb_2O_3$ is 0%, is a preferred embodiment of the first embodiment of the glass of the present invention, and the glass wherein $MoO_3+Sb_2O_3$ is from 0.2 to 1.4%, is a preferred embodiment of the second embodiment of the glass of the present invention.

Now, the above preferred composition will be described. As CuO, $MoO_3$ and $Sb_2O_3$ have already been described above, their description will be omitted.

PbO is essential as it is effective for lowering the softening point and increasing the expansion coefficient. If it is less than 25%, such effects tend to be too small. It is preferably at least 30%. If it exceeds 85%, the relative dielectric constant tends to be too large or yellowing tends to be too deep. It is preferably at most 83.8%, more preferably at most 75%.

$B_2O_3$ is not essential, but may be incorporated up to 60% in order to stabilize the glass or in order to increase the fluidity of the glass during firing thereby to reduce bubbles remaining in the glass layer covering electrodes and to increase the transparency. If it exceeds 60%, the softening point tends to be too high, or the glass is likely to undergo phase separation. It is preferably at most 55%. In a case where $B_2O_3$ is incorporated, it is preferably incorporated in an amount of at least 10%, particularly preferably at least 11%, most preferably at least 23%. The size of the above-mentioned remaining bubbles is typically 30 $\mu$m.

$SiO_2$ is not essential, but may be incorporated up to 40% in order to stabilize the glass, or in order to suppress a color-development phenomenon by colloidal silver. Here, the color-development phenomenon by colloidal silver is a phenomenon such that when silver-containing bus electrodes formed on a glass substrate of the front substrate of PDP are coated with glass, silver will diffuse in the glass to color the glass with a brown color thereby to deteriorate the image quality of PDP. $SiO_2$ is considered to be effective for controlling such diffusion of silver. If the $SiO_2$ content exceeds 40%, the fluidity of glass during firing tends to be low, whereby bubbles remaining in the glass layer covering electrodes tend to increase thereby to deteriorate the transmittance. The $SiO_2$ content is more preferably at most 35%, further preferably at most 15%, most preferably at most 12%.

When it is particularly desired to suppress the above-mentioned color-development phenomenon by colloidal silver, the $SiO_2$ content is preferably at least 5%, more preferably at least 6.6%. Further, in such a case, the PbO content is preferably at most 83.8%, and the $B_2O_3$ content is preferably at most 11%.

$Al_2O_3$ is not essential, but may be incorporated up to 25% in order to stabilize the glass. If it exceeds 25%, the glass is likely to undergo devitrification. It is more preferably at most 15%, particularly preferably at most 10%.

$Bi_2O_3$ is not essential, but may be incorporated up to 35% in order to lower the softening point. If it exceeds 35%, the glass is likely to be colored yellow, or the relative dielectric constant tends to be too large. It is more preferably at most 30%, particularly preferably at most 5%.

Each of MgO, CaO, SrO and BaO is not essential, but may be incorporated up to 40% in order to increase the water resistance of the glass or in order to suppress phase separation of the glass. Further, in a case where it is particularly desired to lower the relative dielectric constant of the glass, it is preferred to incorporate MgO. If the content of any one of these components exceeds 40%, crystallization during firing tends to be remarkable, whereby the transmittance is likely to be low. It is more preferably at most 35%, particularly preferably at most 30%.

Further, MgO is most preferably at most 5%. If it exceeds 5%, the fluidity of the glass during firing tends to be low, and bubbles remaining in the glass layer covering electrodes are likely to increase, whereby the transmittance is likely to be low.

The total content of MgO, CaO, SrO and BaO is preferably at most 40%, more preferably at most 35%.

ZnO is not essential, but may be incorporated up to 55% in order to lower the softening point. If it exceeds 55%, the glass is likely to undergo devitrification. It is more preferably at most 10%.

Each of $Li_2O$, $Na_2O$ and $K_2O$ is not essential, but may be incorporated up to 20% in order to lower the softening point. If any one of them exceeds 20%, the water resistance of the glass is likely to be low, or the expansion coefficient tends to be too large. Each of them is more preferably at most 5%.

The total content of $Li_2O$, $Na_2O$ and $K_2O$ is preferably at most 20%, more preferably at most 5%.

It is preferred that the glass of the present invention consists essentially of the above-described components. However, other components may be incorporated up to 10% within a range not to impair the purpose of the present invention.

In the front substrate of the plasma display device of the present invention (hereinafter referred to as PDP of the present invention), transparent electrodes are formed on a glass substrate, and the surface of the glass substrate having such transparent electrodes formed thereon, is covered with the glass of the present invention. The thickness of the glass substrate to be used for the front substrate is usually 2.8 mm, and the transmittance of this glass substrate itself to a light with a wavelength of 550 nm (hereinafter referred to as $T_{550}$) is typically 90%. Further, its turbidity is typically 0.4%.

Further, the transparent electrodes are, for example, strips with a width of 0.5 mm, and the respective strip electrodes are formed to be in parallel with one another. The distance between the center lines of the respective strip electrodes is, for example, from 0.83 to 1.0 mm, and in such a case, the proportion of the glass substrate surface occupied by the transparent electrodes is from 50 to 60%.

For the front substrate of PDP of the present invention, $T_{550}$ is preferably at least 77%. If it is less than 77%, the image quality of PDP tends to be low. It is more preferably at least 79%, particularly preferably at least 80%. Further, its turbidity is preferably at most 21%. If it exceeds 21%, the image quality of PDP tends to be low. It is more preferably at most 20%, particularly preferably at most 15%.

PDP of the present invention can be produced as follows, for example, when it is of an alternating current system.

As shown in FIG. 1, patterned transparent electrodes 2 and bus bars (not shown) are formed on the surface of a glass substrate 1a. Then, a powder of the glass of the present invention is coated and fired to form a glass layer 3. Finally, a magnesium oxide layer (not shown) is formed as a protecting layer, to obtain a front substrate 10. On the other hand, on a glass substrate 1b, patterned electrodes 5 for address are formed. Then, barrier ribs 6 are formed in a stripe shape, and phosphor layers 4 are further printed and fired, to obtain a rear substrate 20.

Along the periphery of the front substrate 10 and the rear substrate 20, a sealing material (not shown) is coated by a dispenser, and the front and rear substrates are assembled so that the transparent electrodes 2 face the electrodes 5 for address, followed by firing to obtain a plasma display device. Then, the interior of the plasma display device is evacuated, and a discharge gas such as Ne or He—Xe is sealed in the discharge space 7.

The above example is of an alternating system. However, the present invention is applicable also to a display device of a direct current system.

Now, the present invention will be described in further detail with reference to Examples. However, it should be understood that the present invention is by no means restricted to such specific Examples.

EXAMPLES

Starting materials were mixed so that the composition would be as shown in Table 1 by mass percentage in lines for from PbO to $Sb_2O_3$. Then, this mixture was melted for 1 hour by means of a platinum crucible in an electric furnace of 1,300° C. and formed into a thin sheet glass. This thin sheet glass was pulverized by a ball mill to obtain a glass powder. Example 1 to 10 represent Examples of the present invention, and Examples A1 to A7 represent Comparative Examples.

With respect to each glass, the softening point (unit: ° C.), the expansion coefficient (unit: $10^{-7}$/° C.) and the relative dielectric constant were measured as described below, and the results are shown in Table 1. The relative dielectric constant was measured with respect to Examples 3, 4, A2, 7, 8 and A5.

Softening point: Measured by means of a differential thermal analyzer.

Expansion coefficient: The glass powder was shaped and then fired for 10 minutes at a firing temperature (unit: ° C.) as identified in Table 1 to obtain a fired product, which was processed into a cylindrical shape with a diameter of 5 mm and a length of 2 cm, whereupon the average linear expansion coefficient in a range of from 50 to 350° C. was measured by a thermal expansion meter.

Dielectric constant: The above fired product was processed into 50 mm×50 mm×3 mm in thickness, and electrodes were vapor-deposited on its surface, whereupon the relative dielectric constant was measured at a frequency of 1 MHz.

Further, such a glass powder and ethyl cellulose were weighed and mixed so that the mass ratio would be 100:5, and 2 g of the obtained mixture was introduced into a cylindrical mold having a diameter of 12 mm and molded to obtain a cylindrical test sample. This cylindrical test sample was fired for 30 minutes at the softening point of the glass powder to obtain a disk-shaped fired body. The color of this fired body is shown in Table 1. A fired body having a brown or black color is considered to contain a large amount of carbon-containing impurities. Accordingly, the fired bodies of Examples A2, A3, A5, A6 and A7 are considered to contain large amounts of carbon-containing impurities.

Further, 100 g of such a glass powder was kneaded with 25 g of an organic vehicle to obtain a glass paste. The organic vehicle was one having ethyl cellulose dissolved in an amount of from 7 to 18% by mass percentage to diethylene glycol monobutyl ether monoacetate or α-terpineol.

Then, a glass substrate having a size of 10 cm×10 cm and a thickness of 2.8 mm was prepared, and on the surface of this glass substrate, a number of ITO transparent electrodes having a thickness of 200 nm and a width of 0.5 mm were formed in parallel with one another so that the distance between the center lines of the respective ITO transparent electrodes, would be 1.0 mm. This glass substrate is made of a glass having a composition, as represented by mass percentage, of $SiO_2$: 58%, $Al_2O_3$: 7%, $Na_2O$: 4%, $K2O$: 6.5%, MgO: 2%, CaO: 5%, SrO: 7%, BaO: 7.5% and $ZrO_2$: 3%, a glass transition point of 626° C. and an expansion coefficient of $83 \times 10^{-7}/°$ C. Further, the above-mentioned ITO transparent electrodes were formed on one side of the glass substrate.

To a portion of 30 mm×30 mm having ITO transparent electrodes formed, the above-mentioned glass paste was uniformly screen-printed and then dried at 120° C. for 10 minutes. This glass substrate was heated at a temperature rising rate of 10° C./min until the temperature reached the firing temperature (unit: ° C.) as identified in Table 1 and further maintained at that temperature for 30 minutes for firing. The thickness of the glass layer which covered the transparent electrodes, was 30 μm.

With respect to the glass substrate after firing, the transmittance (unit: %) of light with a wavelength of 550 nm and the turbidity (unit: %) were measured as described below.

The results are shown in Table 1.

Transmittance: The transmittance of light with a wavelength of 550 nm was measured by means of a selfrecording spectrophotometer U-3500 (integrating sphere type) manufactured by Hitachi, Ltd. The transmittance with no sample was taken as 100%.

Turbidity: A haze meter (illuminant C using a halogen bulb) manufactured by Kabushiki Kaisha Suga Shikenki, was used. The light from the halogen bulb was passed through a lens to obtain parallel light rays, which were passed through the sample, whereby the total transmittance Tt and the diffused transmittance Td were measured by an integrating sphere. The turbidity was calculated by the formula:

$$\text{Turbidity } (\%) = (Td/Tt) \times 100$$

From comparisons between Examples 1 and 2 and Example A1, between Example 3, 4 and 5 and Example A2, between Example 6 and Example A3, between Example 7 and Example A4, between Example 8 and Example A5, between Example 9 and Example A6, and between Example 10 and Example A7, it is evident that when CuO is incorporated within a range of from 0.1 to 0.9%, the transmittance is increased, and the turbidity is decreased.

Further, with respect to Examples 3, 4, A2, 7, 8 and A5, the color-development phenomenon by colloidal silver was examined as follows.

To a portion of 45 mm×45 mm on a glass substrate having a size of 50 mm×75 mm and a thickness of 2.8 mm made of the same glass as the glass substrate used above, a silver paste for screen printing was uniformly screen-printed and then dried at 120° C. for 10 minutes. This glass substrate was heated to 580° C. at a temperature rising rate of 10° C./min and further maintained at that temperature for 15 minutes for firing, to obtain a silver fired product having a thickness of 5 μm.

A glass paste was screen-printed to cover the entire surface of the silver fired product formed on the glass substrate, dried and fired to form a glass layer having a thickness of 30 μm. The conditions for the drying and firing were the same as in the case of the above-mentioned glass paste.

With respect to the sample having a silver fired product formed on the glass substrate and further having the glass layer formed thereon, the reflectance $R_{550}$ (unit: %) of light with a wavelength of 550 nm and the reflectance $R_{430}$ (unit: %) of light with a wavelength of 430 nm were measured by the above-mentioned self-recording spectrophotometer by irradiating the light to the above-mentioned glass layer side. $R_{550}-R_{430}$ (unit: %) is shown in the line for "Color development by colloidal silver" in Table 1. The wavelength of 430 nm was selected, since it corresponds to the absorption peak of colloidal silver attributable to the silver color development. On the other hand, the wavelength of 550 nm was selected, since it was sufficiently apart from the absorption peak of the colloidal silver.

One with $R_{550}-R_{430}$ being 20% or higher, is not desirable, since the color-development phenomenon by colloidal silver is distinct. It is more preferably at most 15%, particularly preferably at most 5%.

TABLE 1

| | Examples | | | | | | | | | | | |
|---|---|---|---|---|---|---|---|---|---|---|---|---|
| | 1 | 2 | A1 | 3 | 4 | 5 | A2 | 6 | A3 | 7 | A4 | 8 |
| PbO | 30.5 | 30.5 | 30 | 40 | 40.1 | 40 | 40 | 34.5 | 34.5 | 39 | 39 | 48.5 |
| $B_2O_3$ | 38 | 38 | 37.5 | 30 | 30 | 30 | 30 | 37.5 | 38 | 33 | 33 | 23 |
| $SiO_2$ | 3 | 2.7 | 2.5 | 8 | 8 | 8 | 8 | 2 | 2.5 | 6.6 | 6 | 13 |
| $Al_2O_3$ | 0 | 0 | 0 | 4 | 4 | 4 | 4 | 0 | 0 | 1 | 2 | 3.2 |
| MgO | 0 | 0 | 0 | 0 | 0 | 0 | 0 | 0 | 0 | 0 | 0 | 0 |
| BaO | 28 | 28 | 27.5 | 17.5 | 17.8 | 17.3 | 18 | 25.5 | 25 | 20 | 18.5 | 12 |
| ZnO | 0 | 0 | 0 | 0 | 0 | 0 | 0 | 0 | 0 | 0 | 0 | 0 |
| CuO | 0.5 | 0.8 | 2.5 | 0.5 | 0.1 | 0.5 | 0 | 0.5 | 0 | 0.4 | 0.9 | 0.3 |
| $MoO_3$ | 0 | 0 | 0 | 0 | 0 | 0 | 0 | 0 | 0 | 0 | 0 | 0 |
| $Sb_2O_3$ | 0 | 0 | 0 | 0 | 0 | 0.2 | 0 | 0 | 0 | 0 | 0.6 | 0 |
| Softening point | 610 | 610 | 610 | 580 | 580 | 585 | 580 | 600 | 600 | 600 | 600 | 560 |
| Expansion coefficient | 80 | 80 | 80 | 75 | 75 | 74 | 75 | 80 | 80 | 77 | 77 | 75 |
| Firing temp. | 590 | 580 | 580 | 570 | 570 | 580 | 580 | 580 | 580 | 580 | 580 | 550 |
| Color of fired product | Light green | Bluish green | green | Light green | Light green | Light green | black | Light green | Dark brown | Bluish green | green | Light green |
| Transmittance | 82 | 82 | 70 | 82 | 81 | 82 | 78 | 82 | 78 | 83 | 75 | 77 |
| Turbidity | 10 | 10 | 24 | 12 | 13 | 14 | 17 | 10 | 17 | 12 | 18 | 20 |
| Dielectric constant | — | — | — | 9.6 | 9.6 | — | 9.6 | — | — | 9.8 | — | 10.4 |
| Color development by colloidal Silver | — | — | — | 2 | 15 | — | 74 | — | — | 3 | — | 5 |

TABLE 1-continued

|  | Examples | | | | |
| --- | --- | --- | --- | --- | --- |
|  | A5 | 9 | A6 | 10 | A7 |
| PbO | 48.5 | 43.5 | 43.5 | 31.5 | 31.5 |
| $B_2O_3$ | 23 | 45.3 | 45.5 | 39.1 | 39.5 |
| $SiO_2$ | 13 | 3.5 | 3.5 | 3.0 | 3.0 |
| $Al_2O_3$ | 3.5 | 0 | 0 | 0 | 0 |
| MgO | 0 | 7.4 | 7.5 | 0 | 0 |
| BaO | 12 | 0 | 0 | 22 | 22 |
| ZnO | 0 | 0 | 0 | 4 | 4 |
| CuO | 0 | 0.3 | 0 | 0.4 | 0 |
| $MoO_3$ | 0 | 0 | 0 | 0 | 0 |
| $Sb_2O_3$ | 0 | 0 | 0 | 0 | 0 |
| Softening point | 560 | 620 | 620 | 610 | 610 |
| Expansion coefficient | 76 | 68 | 67 | 75 | 75 |
| Firing temp. | 550 | 590 | 590 | 580 | 580 |
| Color of fired product | brown | Light green | black | Light green | black |
| Transmittance | 73 | 77 | 71 | 82 | 79 |
| Turbidity | 24 | 21 | 26 | 15 | 16 |
| Dielectric constant | 10.4 | — | — | — | — |
| Color development by colloidal Silver | 50 | — | — | — | — |

By using the glass of the present invention, the transparency of the glass layer covering transparent electrodes on a glass substrate can be made high. Further, the amount of carbon-containing impurities remaining in the glass layer can be reduced, whereby deterioration in brightness in PDP can be reduced. Further, the color-development phenomenon by colloidal silver for the glass layer covering silver electrodes on a glass substrate can be suppressed. Further, the relative dielectric constant of the glass layer covering electrodes can be made small.

With PDP of the present invention, the transmittance of its front substrate is high, and the image quality is excellent. Further, deterioration in brightness scarcely takes place. Further, the color-development phenomenon by colloidal silver of the glass layer covering silver electrodes on the front substrate can be suppressed, and the image quality can be improved also from this viewpoint. Further, the electric power consumption can be reduced.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 11-330122 filed on Nov. 19, 1999 including specification, claims, drawings and summary are incorporated herein by reference in its entirety.

What is claimed is:

1. A low melting point glass for covering electrodes, the glass containing

Cu in an amount calculated as CuO within a range of from 0.2 to 0.9 mass %, and at least one of Mo and Sb, wherein the total of the amount of Cu calculated as CuO, the amount of Mo calculated as $MoO_3$, and the amount of Sb calculated as $Sb_2O_3$ is within a range of from 0.3 to 1.4 mass %.

2. The glass according to claim 1, wherein the glass has a softening point within a range of from 450 to 650° C.

3. The glass according to claim 1, wherein the glass consists essentially of, based on the following oxides, 25 to 85 mass % PbO, 0 to 60 mass % $B_2O_3$, 0 to 40 mass % $SiO_2$, 0 to 25 mass % $Al_2O_3$, 0 to 35 mass % $Bi_2O_3$, 0 to 40 mass % MgO, 0 to 40 mass % CaO, 0 to 40 mass % SrO, 0 to 40 mass % BaO, 0 to 55 mass % ZnO, 0 to 20 mass % $Li_2O$, 0 to 20 mass % $Na_2O$, 0 to 20 mass % $K_2O$, 0.2 to 0.9 mass % CuO, 0 to 1.3 mass % $MoO_3$, and 0 to 1.3 mass % $Sb_2O_3$, wherein MgO+CaO+SrO+BaO is from 0 to 40 mass %.

4. The glass according to claim 3, wherein PbO is at most 83.8 mass %, $SiO_2$ is at least 5 mass %, and $B_2O_3$ is at least 11 mass %.

5. The glass according to claim 1, wherein the glass has an average linear expansion coefficient in a range of from 50 to 350° C. within a range of from $60 \times 10^{-7}$ to $90 \times 10^{-7}$/° C.

6. The glass according to claim 1, wherein the glass has a relative dielectric constant of at most 12.

7. A plasma display device including a front substrate comprising a glass substrate, transparent electrodes on the glass substrate, and the glass of claim 1 on the transparent electrodes.

8. A method of making a plasma display device, the method comprising firing a glass powder coated on transparent electrodes on a glass substrate; and producing the plasma display device of claim 7.

9. The glass according to claim 1, wherein the glass contains Mo.

10. A method of making a low melting point glass, the method comprising melting a mixture of staring materials; and producing the glass of claim 1.

11. A low melting point glass for covering electrodes, the glass consisting essentially of, based on the following oxides, 25 to 85 mass % PbO,
0 to 60 mass % $B_2O_3$,
0 to 40 mass % $SiO_2$,
0 to 25 mass % $Al_2O_3$,
0 to 35 mass % $Bi_2O_3$,
0 to 40 mass % MgO,
0 to 40 mass % CaO,
0 to 40 mass % SrO,
0 to 40 mass % BaO,
0 to 55 mass % ZnO,
0 to 20 mass % $Li_2O$,
0 to 20 mass % $Na_2O$,
0 to 20 mass % $K_2O$, and
0.1 to 0.9 mass % CuO, wherein MgO+CaO+SrO+BaO is from 7.4 to 40 mass %.

12. The glass according to claim 11, wherein the glass has a softening point within a range of from 450 to 650° C.

13. The glass according to claim 11, wherein the glass has an average linear expansion coefficient in a range of from 50 to 350° C. within a range of from $60 \times 10^{-7}$ to $90 \times 10^{-7}$/° C.

14. The glass according to claim 11, wherein the glass has a relative dielectric constant of at most 12.

15. A plasma display device including a front substrate comprising a glass substrate, transparent electrodes on the glass substrate, and the glass of claim 11 on the transparent electrodes.

16. A method of making a plasma display device, the method comprising coating a glass powder on transparent electrodes on a glass substrate; and producing the plasma display device of claim 15.

17. A method of making a low melting point glass, the method comprising melting a mixture of starting materials; and producing the glass of claim 11.

18. A low melting point glass for covering electrodes, the glass consisting essentially of, based on the following oxides, 25 to 85 mass % PbO,
0 to 60 mass % $B_2O_3$,
0 to 40 mass % $SiO_2$,
0 to 25 mass % $Al_2O_3$,
0 to 35 mass % $Bi_2O_3$,
0 to 40 mass % MgO,
0 to 40 mass % CaO,
0 to 40 mass % SrO,
0 to 40 mass % BaO,
0 to 55 mass % ZnO,
0 to 20 mass % $Li_2O$,
0 to 20 mass % $Na_2O$,
0 to 20 mass % $K_2O$,
0.1 to 0.9 mass % CuO,
0 to 1.3 mass % $MoO_3$, and
0 to 1.3 mass % $Sb_2O_3$, wherein MgO+CaO+SrO+BaO is from 0 to 40 mass %, the glass contains at least one of Mo and Sb, and CuO+$MoO_3$+$Sb_2O_3$ is from 0.2 to 1.4 mass %.

19. The glass according to claim 18, wherein PbO is at most 83.8 mass %, $SiO_2$ is at least 5 mass %, and $B_2O_3$ is at least 11 mass %.

20. The glass according to claim 18, wherein the glass has a softening point within a range of from 450 to 650° C.

21. The glass according to claim 18, wherein the glass has an average linear expansion coefficient in a range of from 50 to 350° C. within a range of from $60 \times 10^{-7}$ to $90 \times 10^{-7}$/° C.

22. The glass according to claim 18, wherein the glass has a relative dielectric constant of at most 12.

23. A plasma display device including a front substrate comprising a glass substrate, transparent electrodes on the glass substrate, and the glass of claim 18 on the transparent electrodes.

24. A method of making a plasma display device, the method comprising coating a glass powder on transparent electrodes on a glass substrate; and producing the plasma display device of claim 23.

25. A method of making a low melting point glass, the method comprising melting a mixture of staring materials; and producing the glass of glass claim 18.

\* \* \* \* \*